Patented June 12, 1928.

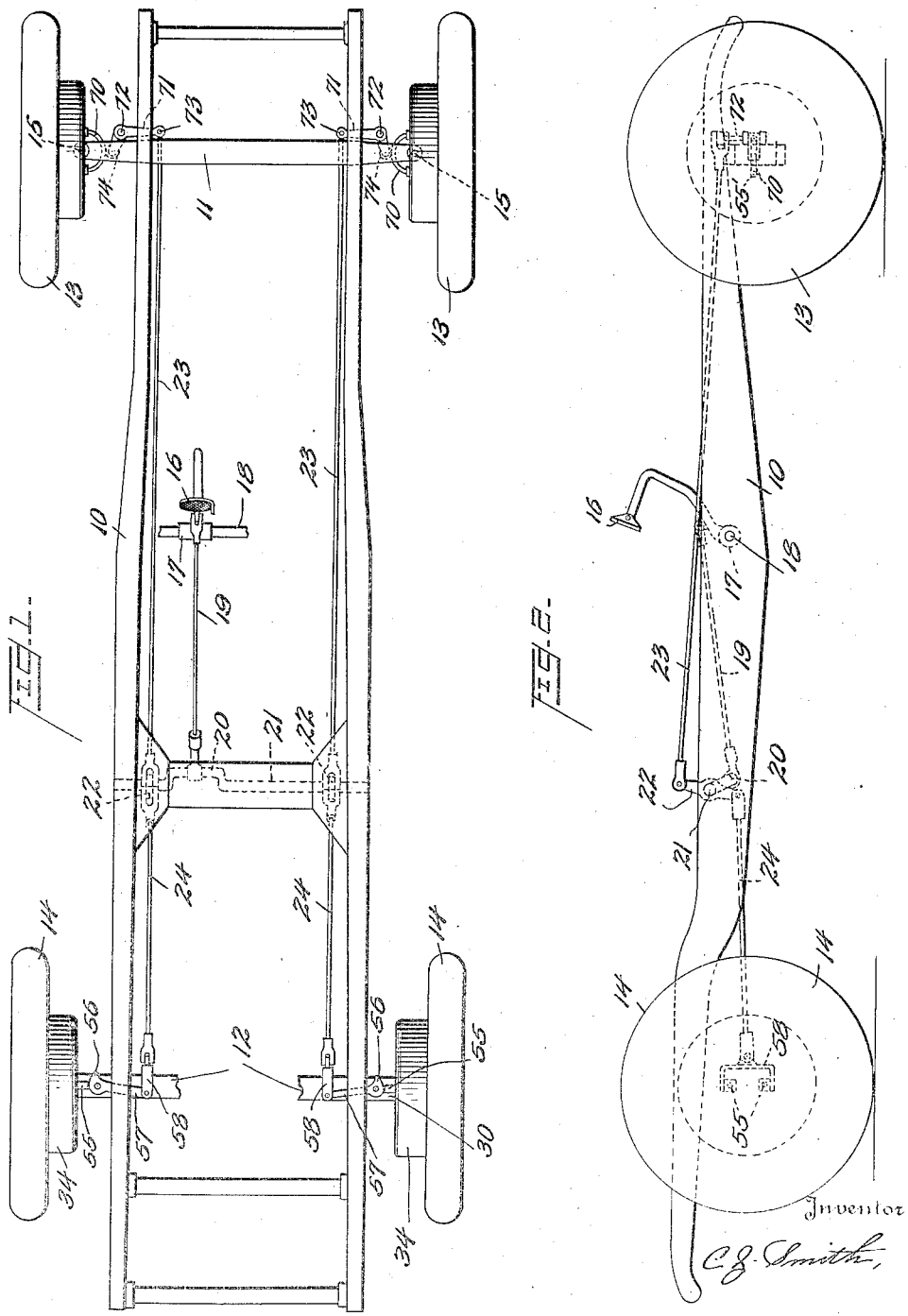

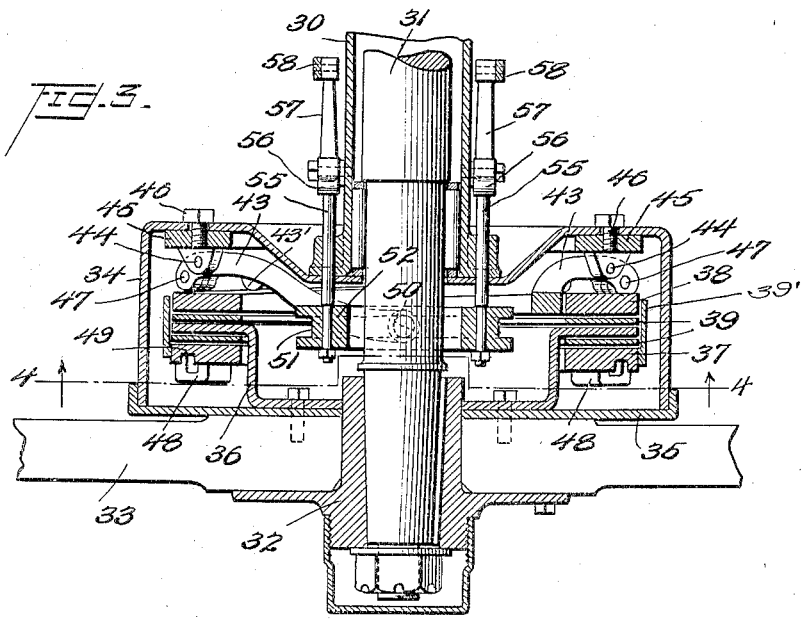
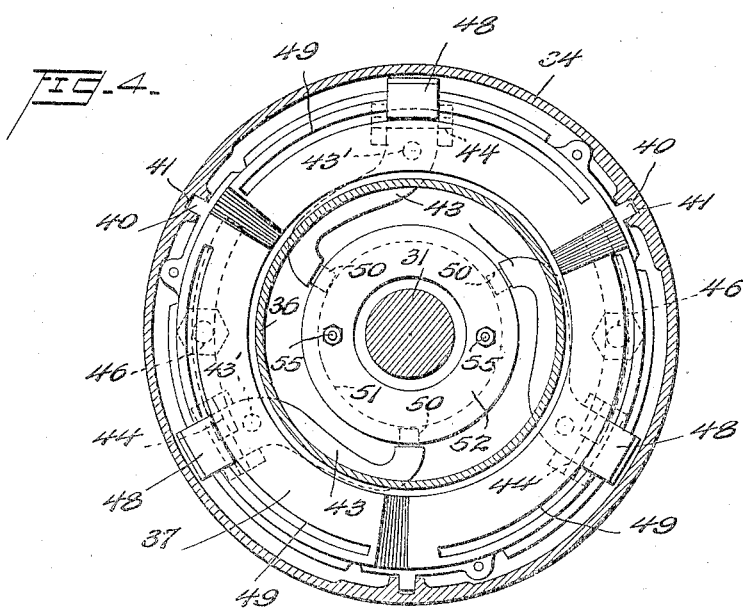

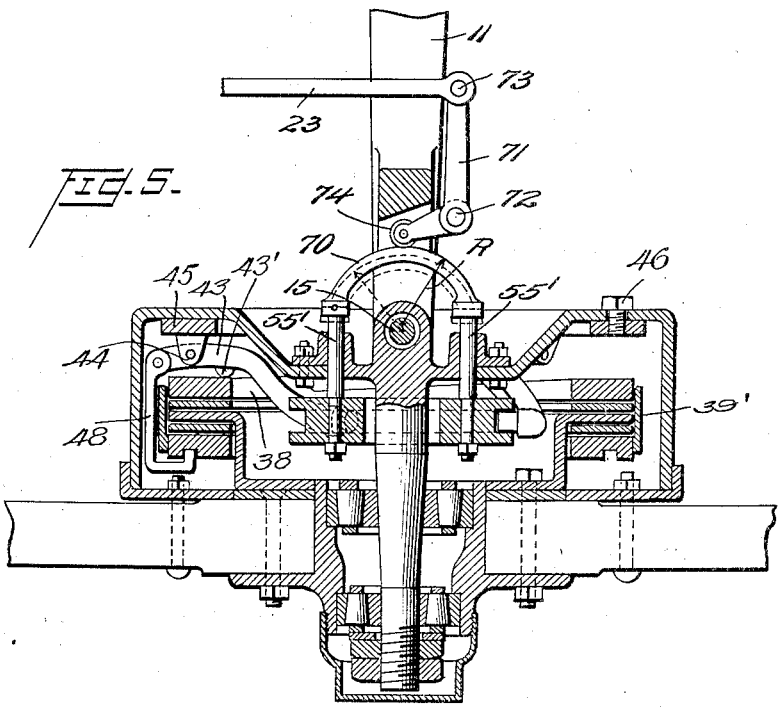
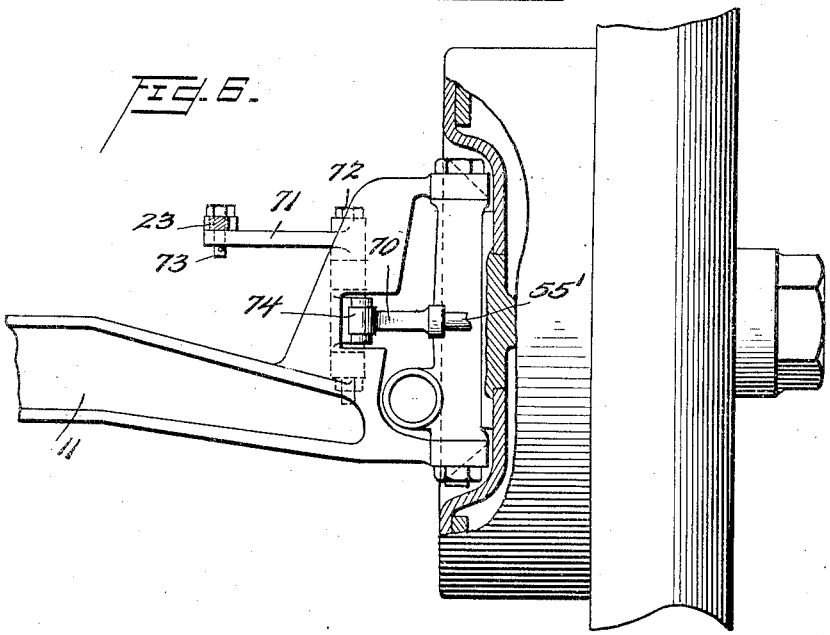

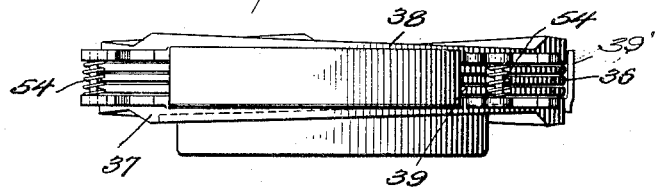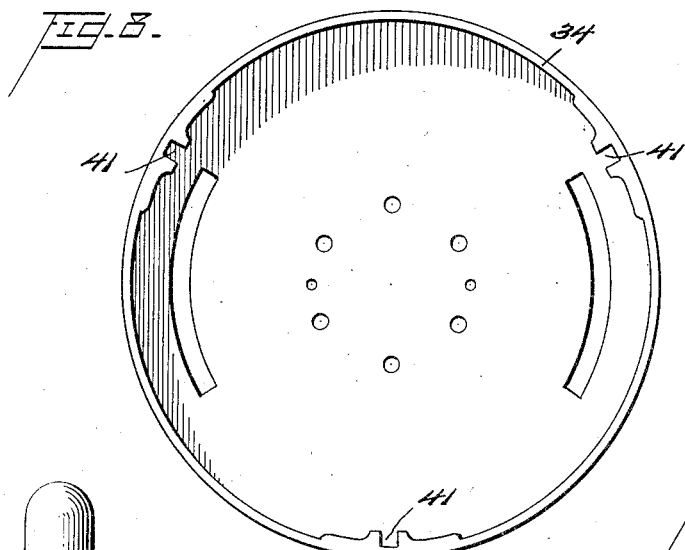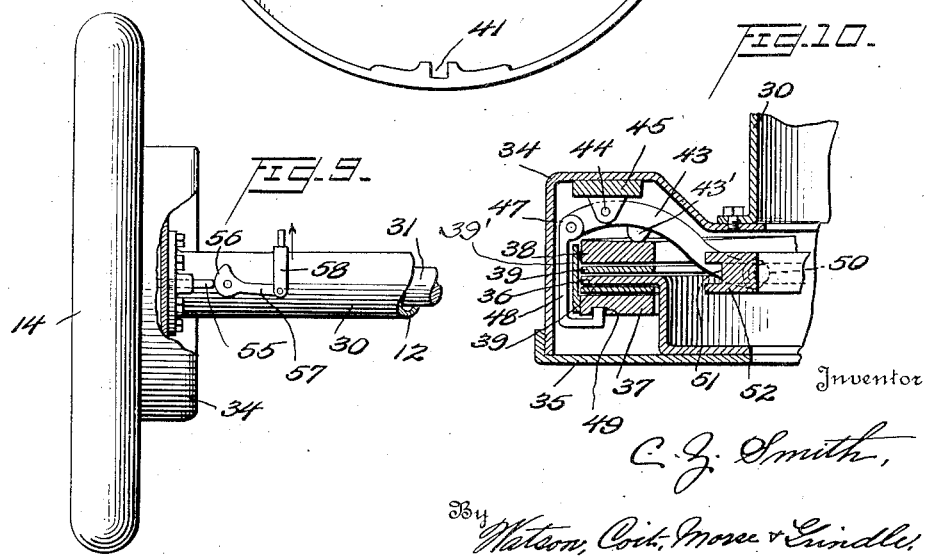

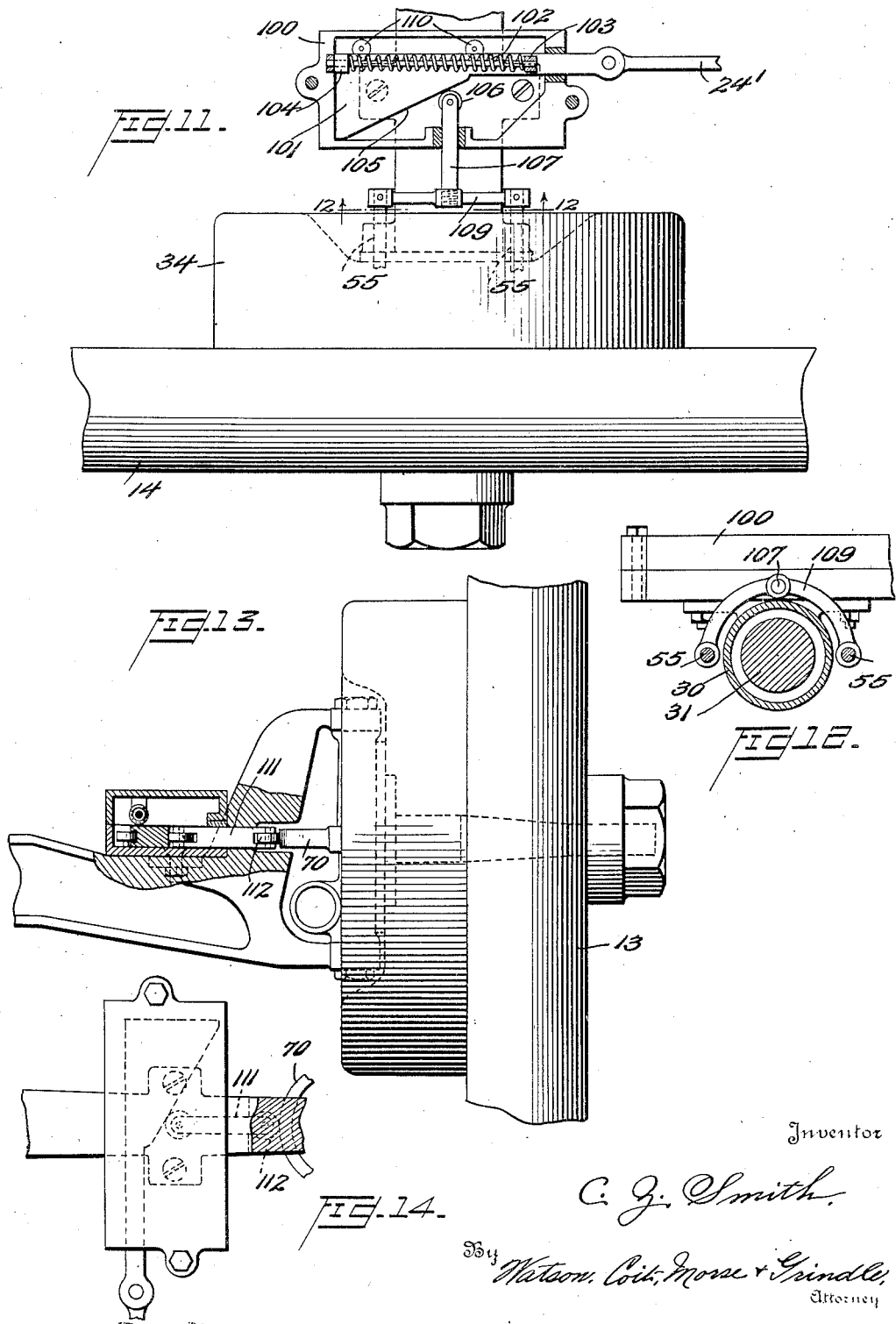

1,673,713

UNITED STATES PATENT OFFICE.

CLARENCE ZENO SMITH, OF ATLANTA, GEORGIA.

AUTOMOBILE BRAKE.

Application filed January 21, 1924. Serial No. 687,602.

The present invention relates to vehicle brakes and particularly to braking systems for automobiles.

It is the object of the invention to provide improved brakes, both for the front and rear wheels of a vehicle, and also to provide an improved braking system whereby the brakes may be applied simultaneously to the four wheels of a vehicle, particularly a motor vehicle. The invention has a number of novel features and advantages which will be described in detail in the following specification and pointed out in the claims. The drawings forming a part of this application illustrate one form of the invention, with certain modifications, which is disclosed by way of example, but it will be understood by those skilled in the art that the design and arrangement of the component elements of the invention may be considerably modified without departing from its spirit or scope.

In the drawings:

Figure 1 is a plan view of the chassis of an automobile showing my improved braking system incorporated therewith;

Figure 2 is a side elevation of the same;

Figure 3 is an axial section through one of the rear wheel brakes;

Figure 4 is a section on line 4—4 of Figure 3;

Figure 5 is an axial section through one of the front wheel brakes;

Figure 6 is a front elevation of the same, partly broken away;

Figure 7 is an edge view of the braking elements in assembled relation;

Figure 8 is a side elevation of the brake housing; the braking elements having been removed;

Figure 9 is a rear elevation of one of the rear wheel brakes partly broken away;

Figure 10 is a partial section, taken radially, through one of the rear wheel brakes;

Figure 11 is a plan view, partly broken away, of a modified form of rear wheel brake operating mechanism;

Figure 12 is a section on line 12—12 of Figure 11;

Figure 13 is a rear elevation, partly broken away, of similar mechanism applied to a front wheel brake, and Figure 14 is a top plan view of portion of the mechanism shown in Figure 13.

The frame of the vehicle is indicated generally at 10 and the front and rear axles at 11 and 12 respectively. The front wheels 13 and the rear wheels 14 are connected to the chassis in the usual manner, the front wheels being supported to swing about vertical spindles 15. A foot pedal is indicated at 16 which pedal is supported upon a lever rigid with sleeve 17 rotatably mounted upon transverse rod 18. The pedal supporting lever is also connected by means of a link 19 to the cranked portion 20 of a rock shaft 21 mounted transversely in the frame. Rigid with rock shaft 21 are two two-armed levers 22, the upper arm of each of these levers being connected by means of a rod or link 23 to mechanism for operating a front wheel brake, and the lower end of each lever being connected by a rod or link 24 to mechanism for operating a rear wheel brake. The arrangement is such that depression of the foot pedal 16 causes the brakes to be applied.

The two rear wheel brakes are identical in construction and the two front wheel brakes are identical with each other but not with the rear wheel brakes, the construction of the front wheel brakes, while being generally similar to the construction of the rear wheel brakes being necessarily changed somewhat due to the fact that the front wheels must swing about vertical axes to permit the vehicles to be properly guided.

In Figures 3 and 4 one of the rear wheel brakes is clearly shown. The axle housing is indicated at 30, the axle at 31, the wheel hub at 32 and the spokes at 33. Rigidly secured to the axle housing 30 is a brake housing 34 which incloses the braking elements, a disk shaped dust cover 35 closing the outer end of this housing and preventing the entrance of dust and grit. This dust cover is bolted to the wheel as is also the friction disk 36. Disk 36 is cupped centrally and its peripheral flange, which extends parallel to the wheel, lies between two non-rotating pressure disks 37 and 38 respectively. Intermediate the pressure disks and the brake disk are annular lining members 39 of a composition adapted to be used for brake linings. These lining members are floating, or unattached to the disks, and in order to retain them in position between the disks, arms 39' are secured to one of the disks, in the present instance, to disk 37, so as to extend across the peripheries of the disks and closely adjacent thereto preventing substantial displacement of the lining members. Each of the disks 37 and 38 is provided with projecting portions 40 which extend into slots 41 formed on the inner surface of the cylindrical wall of the brake housing. The pressure disks are therefore prevented from rotating, but at the same time they may be moved axially toward or away from each other.

Means is provided for moving the pressure disks toward each other to cause the lining members 39 to engage the friction disk. From Figures 3, 4 and 10 it will be seen that three levers 43 are equi-distantly spaced around the axle within the axle housing. These levers are pivoted at 44, 44 to a ring 45 secured to the inner wall of the brake housing by screw bolts 46. These bolts 46 extend thru slots in the housing (Fig. 8) so that if they are loosened the ring may be adjusted circumferentially relatively to the housing for adjusting the brakes, in a manner hereinafter to be fully described. Each lever 43 is provided with a lug or boss 43' which bears against the innermost pressure disk 38 and to the outer end of each lever is pivotally secured (at 47) a hook member 48 the outer end of which extends around the outer corner of the pressure disk 37 and engages in a slot 49 formed in its outer face.

The inner end of each lever 43 is provided with a radially extending cylindrical projection 50 which slidably fits in a peripheral slot 51 formed in an annular ring member 52 which is coaxial with the axle 31. Movement of ring 52, it will be seen, will cause movement of each of the levers 43, and if this ring is moved outwardly it will be seen that the cam 43' of each lever exerts an outward pressure upon the inner pressure disk 38, and at the same time the hook 48 exerts an inwardly directed pressure or pull upon the outer pressure disk 37. The two pressure disks are thus drawn toward each other and the linings 39 caused to grip the friction disk. The pressure disks are promptly separated by springs 54 whenever the outward pressure against ring 52 is released, so that the brake is at all times normally released.

For producing the outward movement of ring 52 the two plungers 55 illustrated clearly in Figure 3 are provided. These plungers slidably extend thru apertures in the outer end of the axle housing 30, and in the inner margin of the brake housing, and extend thru openings in the ring 52, nuts being provided on the outer ends of the plungers to hold the parts thus assembled. The inner end of each plunger is adapted to be engaged by a cam 56 on the end of a lever 57 pivoted to the axle housing, the outer ends of these levers being connected by a yoke member 58 so that they are simultaneously operable to produce simultaneous inner movement of the plungers. As can be seen from Figures 1 and 2 each of yokes 58 is pivotally connected to the end of a brake rod 24. Depression of the foot pedal therefore results in forward movement of the yokes 58, outward movement of plungers 55, and movement of pressure disks 37 and 38 toward the friction disk 36.

The front wheel brakes are in principle similar to the rear wheel brakes but, inasmuch as the front wheels swing about spindles 15 there can be no permanent connection between the brake operating plungers 55' and the means secured to the chassis or axle, for operating these plungers. From Figures 5 and 6 it will be seen that the inner ends of plungers 55' are rigidly connected by a curved yoke member 70 so that they are simultaneously operable, the inner curved surface of this yoke member being a circular curve with radius R (Fig. 5). A bell crank lever 71 pivoted to the axle at 72 has its inner end pivotally connected at 73 to the link or rod 23 and to the other arm of this bell crank lever is secured a roller 74 which engages the inner surface of yoke 70. With the brake released, as shown in full lines in Figure 5, the center of the curved surface is eccentric to the axis of spindle 15, but when the brake is applied the center of the curved surface (shown in dotted lines) will lie exactly, or very nearly, on the axis of the spindle so that movement of the wheels in steering will neither increase nor decrease the braking forces.

In use the brake linings will wear, as do all brake linings, and provision is therefore made for adjustment to compensate for wear. The inner surface of each of pressure disks 38 is divided into three equal segments, each slightly inclined with respect to a plane transverse to the axle. Each lug 43' bears against one of these surfaces and may be shifted therealong by rotating ring 45. While ring 45 is secured by bolts 46, these bolts extend thru slots in the housing (see Fig. 8) which construction permits the ring to be rotated. By moving the ring in one direction therefor, wear may be compensated for, and by moving the ring in the opposite direction, additional play may be secured.

A modified form of brake operating mechanism may be employed under certain circumstances, especially when the space available is limited. In Figures, 11 to 14 such a mechanism is illustrated, the first two figures showing it as applied to the rear wheel brake and the second two figures showing it as applied to the front wheel brake. In the case of the rear wheel brake a cam box or housing 100 is securely fastened to the axle housing and this box contains a cam member 101 adapted to be drawn in one direction by brake rod 24' and to be returned to original position automatically by a spring 102. Spring 102 is confined between a lug 103 projecting downwardly from the top of the cam box and a lug 104 projecting upwardly from the cam itself. The inclined surface 105 of the cam is adapted to engage a roller 106 on the plunger 107 in its movements, and to cause longitudinal movement of the plunger 107, which plunger is connected to the two brake plungers 55 by a yoke 109. The brakes may be thus conveniently operated without the use of cam levers, for which there may not always be room. Rollers 110 behind the cam member insure a substantially frictionless movement of the same.

In Figures 13 and 14 substantially the same mechanism is shown, as applied to a front wheel brake. Here the cam member operates a plunger 111 which slidably extends thru an aperture in the spindle holding bracket and is provided with a roller 112 which engages the curved member 70. The operation is the same as the operation of the cam mechanism used with the rear wheel brakes. Both the brakes and brake operating mechanism may be considerably modified in design and arrangement of parts, as will be apparent.

One skilled in the art will appreciate that the invention has numerous advantages over brakes of the prior art. Very large braking surfaces are provided and the housing is such that dust, dirt and grit cannot reach the braking surfaces. The brakes are easily adjusted, easily relined, noiseless and long lasting since there is no possibility of "dragging" taking place. No rivets are necessary to hold the brake lining in place. Oil escaping from the differential can in no way affect the brake nor get on to the wheels or tires. Should the axle or spindle break the wheel can not come off as it is held in place by the friction disk.

Having thus described my invention what I claim as new and desire to be secured by Letters Patent is:

1. A vehicle brake including in combination, a friction disk rotatable with the wheel, two non-rotatable pressure disks, one on each side of said friction disk, and means for moving said pressure disks simultaneously toward the friction disk comprising a plunger movable at right angles to the plane of the friction disk, levers operatively connecting the plunger to both pressure disks, and means for operating the plunger.

2. In a vehicle brake, the combination with the axle housing, rotatable axle and wheel, of a friction disk rotatable with the wheel and pressure disks positioned on opposite sides of the friction disk, said pressure disks being supported from the axle housing, of means for simultaneously moving said pressure disks toward and away from the friction disk including a ring in a plane parallel to the wheel and encircling the axle, levers connecting said ring to each of said pressure disks, and means for moving said ring longitudinally of said axle.

3. The combination with the front axle of a vehicle and a wheel pivoted thereto to swing about a substantially vertical axis of means for braking said wheel whatever the angle between the wheel and axle, said means including a member supported by and movable axially of the wheel and having a curved surface centered about said vertical axis, and an operating member supported on the axle and continually engaging said curved member, for operating the same.

4. A front wheel brake mechanism for vehicles which includes an axle member, a steering knuckle pivoted thereto carrying a wheel, a brake on the wheel and a brake operating plunger on the wheel having a surface curved about the pivotal axis of the steering knuckle, and a manually operable member on the axle having a portion in constant engagement with said curved surface.

5. A vehicle braking mechanism comprising in combination, a disk rotatable with the vehicle wheel and providing oppositely facing annular braking surfaces, a non-rotatable pressure disk adapted to bear on each of said braking surfaces, a lever pivotally supported adjacent one of the pressure disks and having a portion bearing against said disk, a link connecting this lever and the opposite pressure disk, and means for operating the lever to move the pressure disks simultaneously toward the rotatable disk.

6. The combination set forth in claim 5 in which said lever is pivoted intermediate its ends and the link is pivotally connected to the outer end of the lever.

7. The combination set forth in claim 5 in which the lever is pivotally supported intermediate its ends, the link being connected to one end and the operating means to the other, and the lever contacting with the adjacent pressure disk at a point intermediate its fulcrum and the end to which the operating means is connected.

8. The combination set forth in claim 5 in which the lever is supported for adjustment circumferentially of the pressure disks and in which the adjacent surface of the adjacent pressure disk is inclined relatively to its friction facing whereby compensation for wear of the parts may be effected.

9. A vehicle braking mechanism comprising in combination, a disk rotatable with a vehicle wheel and providing oppositely facing annular braking surfaces, a stationary casing enclosing the disk, a ring concentric with the disk and secured to the casing for circumferential adjustment relatively thereto, means for clamping said ring in adjusted positions, a pressure disk on each side of said rotatable disk, and operating means mounted on said ring for forcing said pressure disks against said rotatable disk, the arrangement being such that by rotation of the said ring said last mentioned means may be adjusted to compensate for wear.

10. The combination set forth in claim 9 in which said means includes a plurality of levers pivotally connected to said ring each of which bears against a cam surface formed on the adjacent face of the adjacent pressure disk, for the purpose set forth.

11. A vehicle brake including in combination, a friction disk rotatable with the wheel, two non-rotatable pressure disks, one on each side of said friction disk, and means for moving said pressure disks simultaneously towards the friction disk to exert oppositely directed and balanced pressures thereon, said means comprising a member movable in a direction transverse to the plane of the disks, connections between said member and said pressure disks whereby movement of said member results in simultaneous movement of said pressure disks in opposite directions, and means for operating said member.

12. A vehicle braking mechanism comprising in combination, a disk rotatable with the vehicle wheel and providing oppositely facing annular braking surfaces a non-rotatable pressure disk adapted to bear on each of said braking surfaces, a lever pivotally supported adjacent one of the pressure disks and having a portion bearing against said disk, a link connecting this lever and the opposite pressure disk, and means for operating the lever to move the pressure disks simultaneously toward the rotatable disk, said lever being supported for adjustment circumferentially of the pressure disks, the outer surface of one of the pressure disks being inclined relatively to its friction facing, whereby compensation for wear of the parts may be effected.

13. A vehicle brake including in combination with the axle housing and wheel, a friction disk secured to the wheel, non-rotatable pressure disks, one on each side of said friction disk and supported from the axle housing, a ring surrounding the axle and bodily movable axially thereof, mechanism connecting said ring with said pressure disks adapted to force said pressure disks towards said friction disk when said ring is moved axially in one direction, and means for moving said ring axially.

14. The combination set forth in claim 13 in which the mechanism connecting said ring with said pressure disks comprises a plurality of symmetrically disposed levers each having its inner end engaged by said ring.

15. A vehicle front wheel braking mechanism including in combination, an axle, a steering knuckle pivoted to the end thereof, a wheel and braking mechanism therefor mounted on the steering knuckle, a brake operating element movable with the steering knuckle and an actuator element mounted on the axle, said elements having coacting surfaces one of which is concentric with the pivotal axis of the steering knuckle.

16. A vehicle brake including in combination with the axle housing and wheel, a friction disk secured to the wheel, non-rotatable pressure disks, one on each side of said friction disk and supported from the axle housing, annular lining members intermediate each pressure disk and the friction disk, said lining members being unattached to either of such disks, and arms secured to one of the pressure disks and extending across the edges of the other disks and closely adjacent thereto.

In testimony whereof I hereunto affix my signature.

CLARENCE ZENO SMITH.